United States Patent
Ryan et al.

(10) Patent No.: US 6,216,143 B1
(45) Date of Patent: Apr. 10, 2001

(54) APPARATUS AND METHOD FOR GENERATING ANIMATED COLOR CODED SOFTWARE TRACES

(75) Inventors: Jeffrey Michael Ryan, Byron; Steven M. Fillipi; Thomas Alan Gall, both of Rochester, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/350,274

(22) Filed: Dec. 5, 1994

(51) Int. Cl.[7] .................................................. G06F 17/21
(52) U.S. Cl. .......................... 707/526; 707/528; 707/529; 717/4
(58) Field of Search .......................... 395/183.14, 183.1, 395/183.22, 118; 434/118; 364/192; 371/19; 717/1, 4; 707/500, 526, 528, 529; 714/38, 34, 46

(56) References Cited

U.S. PATENT DOCUMENTS

| | | |
|---|---|---|
| 4,730,315 | 3/1988 | Saito et al. . |
| 4,852,047 | 7/1989 | Lavallee et al. . |
| 4,868,496 | 9/1989 | Havel . |
| 4,872,167 | 10/1989 | Maezawa et al. . |
| 4,885,717 * | 12/1989 | Beck et al. ........................ 395/183.22 |
| 4,965,765 * | 10/1990 | Brown .............................. 395/183.22 |
| 5,021,948 | 6/1991 | Nakayama et al. . |
| 5,038,348 * | 8/1991 | Yoda et al. ....................... 395/183.22 |
| 5,210,859 * | 5/1993 | Aoshima et al. ..................... 395/575 |
| 5,297,248 * | 3/1994 | Clark .................................... 395/155 |
| 5,307,493 * | 4/1994 | Gusenius ............................ 395/700 |
| 5,371,747 * | 12/1994 | Brooks et al. .......................... 371/19 |
| 5,375,125 * | 12/1994 | Oshima et al. ......................... 371/19 |
| 5,410,648 * | 4/1995 | Pazel .................................... 395/158 |
| 5,446,838 * | 8/1995 | Kimelman ............................ 395/161 |

FOREIGN PATENT DOCUMENTS

WO 92/21073  11/1992  (JP) .

OTHER PUBLICATIONS

Turbo Debugger Version 2.0 User's Guide, Borland, pp. 28–29, 62–91, 304–305, 338–339, 1990.*
*Turbo Debugger User's Guide*, Borland, Version 2.0, 1990, pp28–29, 62–91, 304–305, 338–339.*

* cited by examiner

*Primary Examiner*—Joseph H. Feild
(74) *Attorney, Agent, or Firm*—Merchant & Gould

(57) ABSTRACT

Apparatus and method for illustrating an order of execution of software code. At least portions of software code are presented on a display device with the software code representing instructions for operation of a computer under control of a program. A visual indication of an order of execution of the displayed instructions is also presented. In a preferred embodiment, the apparatus and method present the instructions in a plurality of colors, with the colors corresponding to the order of execution of the software code.

23 Claims, 11 Drawing Sheets

63 —— i = 1

62 —— loop: print i

61 —— i = i + 1

60 ——  goto loop

APPARATUS AND METHOD FOR GENERATING ANIMATED COLOR CODED SOFTWARE TRACES

FIELD OF THE INVENTION

The present invention relates to an apparatus and method for presenting software code, and in particular, providing a visual indication of an order of execution of displayed software code.

BACKGROUND OF THE INVENTION

Software programmers work with systems which display software code so that the programmers may, for example, edit and debug the code. While viewing such software code trace, it can be difficult to identify the instructions within the code that have been executed prior to a currently-executed instruction. The advent of trace facilities, and source-code debuggers, may make the task of code debugging easier; however, the complexity of software code is likewise increasing. In addition, software code is not typically executed in a straight sequential path. Unless the code is simple, it tends to have numerous control instructions distributed throughout (for example, FOR loops, WHILE loops, DO loops, IF constructs, and at the lowest level, branch instructions). With the increase in the complexity of software functionality, software modules are becoming more complex as well. Moreover, object-oriented programming compounds the problem; the increase in "jumping" in and out of object-oriented methods makes remembering which instructions had been executed more difficult.

Software trace analysis tools typically provide the programmer/analyst with a "singular view" of the code being executed. For example, only the currently-executed code instruction is usually highlighted with these tools. The task of remembering which instruction was executed just prior to the currently-executed instruction is left to the memory of the programmer/analyst. Accordingly, it can be difficult for a programmer/analyst to remember and identify the sequence in which the instructions were executed, which makes it difficult to trace execution of software code.

SUMMARY OF THE INVENTION

The present invention relates to an apparatus and method for illustrating an order of execution of software code. It presents at least portions of software code on a display device with the software code representing instructions for operation of a computer under control of a program. It then presents with the displayed instructions of the software code a visual indication of an order of execution of the displayed instructions. In a preferred embodiment, the system and method present the instructions in a plurality of colors, with the colors corresponding to the order of execution of the code.

DETAILED DESCRIPTION

Overview

The present invention, in a preferred embodiment, provides a color-coded view of software code trace that identifies the instructions that were executed prior to the most recently executed instruction. Each instruction of the module is displayed in a color representing its order of execution in relation to other instructions. For example, consider each of the colors of the spectrum as representing temperature (white is the hottest—"white hot", red next, orange, . . . violet, black—the coldest temperature). Also consider that instructions "take on heat" as they are being executed, and "cooled" subsequent to being executed.

Table 1 provides an example of a view of a module as five instructions are executed in the following order: instruction 1, instruction 2, instruction 3, instruction 4, and instruction 1 again. Note the color changes to each instruction indicating order of execution. Table 1 shows the colors of the displayed instructions in this example and how those colors may change as the instructions are executed in order to provide a visual indication of the order of execution. While the instructions are indicated as being "colored," they could alternatively be presented with background colors. In addition, a different color scheme (sequence of colors), or even color shading, could be used for indicating the order of execution. As shown in Table 1, the colors change as the instructions are executed. Even though this example shows instructions executed in the sequence in which they appear, software code is typically not linearly executed and, therefore, the coloring assists in providing a user with an indication of such order of execution.

TABLE 1

Prior to beginning the source-level trace, all instructions are usually displayed in the same color (for example, black on a grey background).

| | color of instructions | operation |
|---|---|---|
| (1) | instruction 1 (black)<br>instruction 2 (black)<br>instruction 3 (black)<br>instruction 4 (black) | prior to execution |
| (2) | instruction 1 (white)<br>instruction 2 (black)<br>instruction 3 (black)<br>instruction 4 (black) | instruction 1 executed |
| (3) | instruction 1 (red)<br>instruction 2 (white)<br>instruction 3 (black)<br>instruction 4 (black) | instruction 2 executed |

TABLE 1-continued

Prior to beginning the source-level trace, all instructions are usually displayed in the same color (for example, black on a grey background).

| | color of instructions | operation |
|---|---|---|
| (4) | instruction 1 (orange)<br>instruction 2 (red)<br>instruction 3 (white)<br>instruction 4 (black) | instruction 3 executed |
| (5) | instruction 1 (yellow)<br>instruction 2 (orange)<br>instruction 3 (red)<br>instruction 4 (white) | instruction 4 executed |
| (6) | instruction 1 (white)<br>instruction 2 (yellow)<br>instruction 3 (orange)<br>instruction 4 (red) | instruction 1 executed |

Appendix B shows how the order of execution may be.

System Operation

Figure 1:
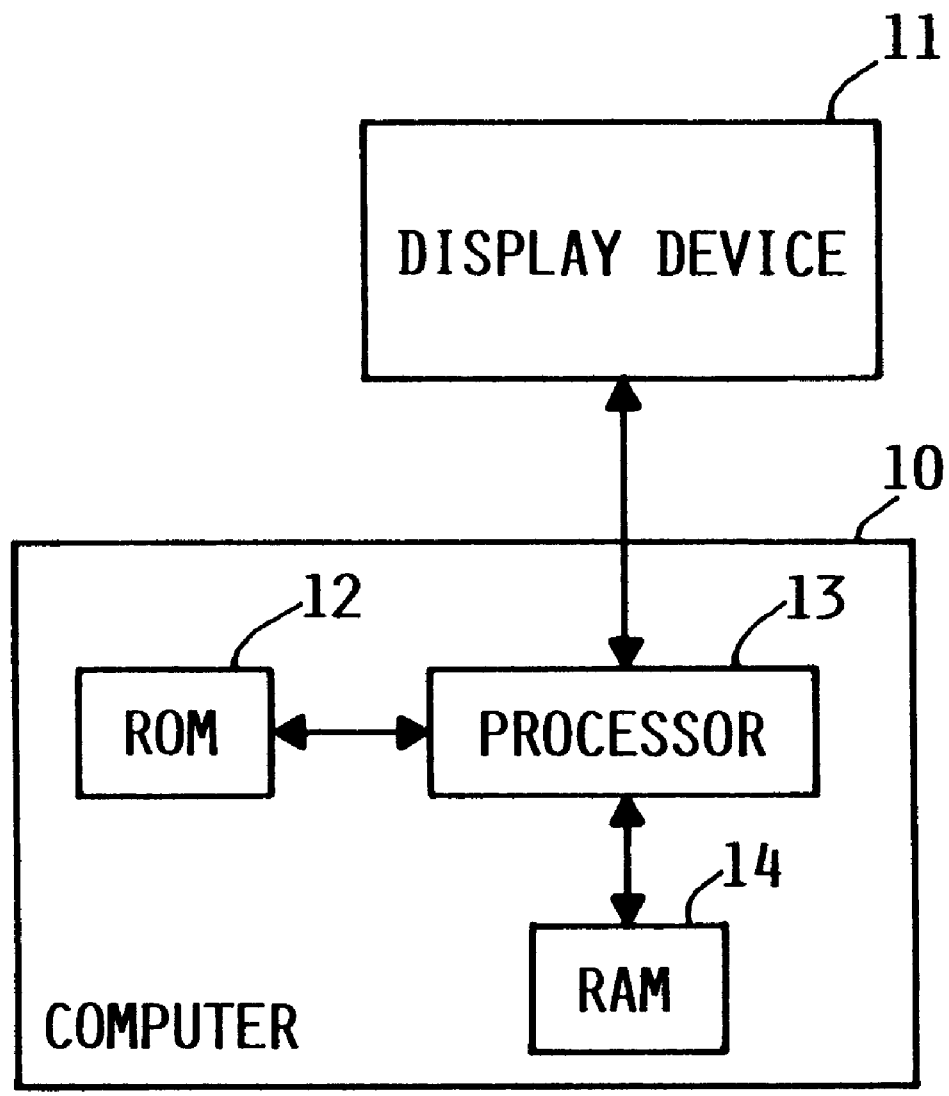
FIG. 1 is a block diagram of a computer-based system for implementing the present invention.

FIG. 1 is a block diagram of a system for implementing the present invention within a computer 10. The computer 10 may be implemented with a typical personal computer or the like, such as an IBM-compatible personal computer. The computer 10 includes a processor 13 coupled to a ROM 12, which may store a software program for implementing the present invention. The computer 10 further includes a random access memory 14 for temporary storage of data. A display device 11 is coupled to the computer 10 for displaying, for example, software code. The display device 11 may be implemented with a typical computer monitor.

Figure 2:
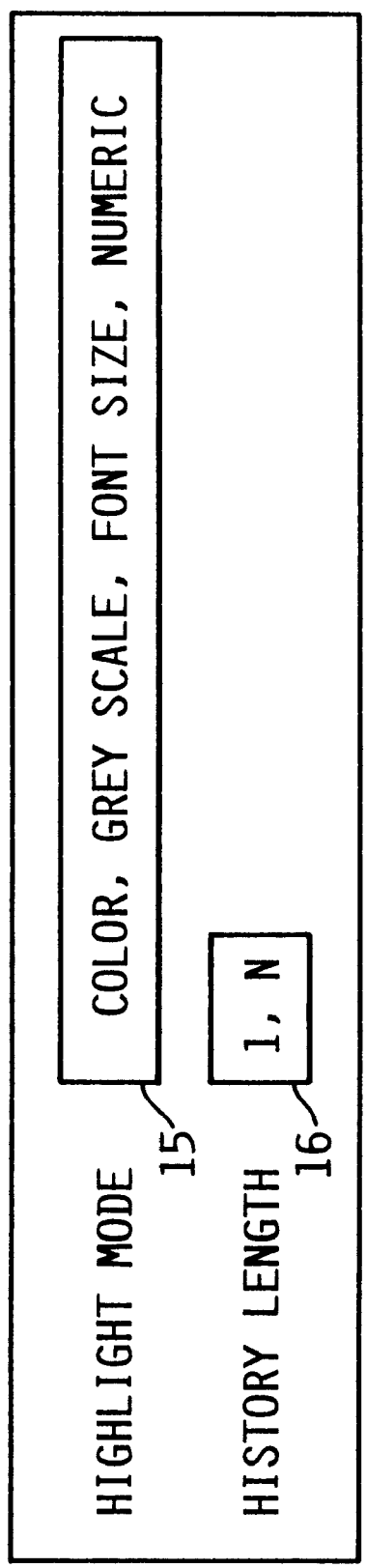
FIG. 2 is a block diagram of preferred set-up and control options available to a user when using the present invention.

FIG. 2 is a diagram of set-up and control options for a user when working with an implementation of the present invention. A user may select a highlight mode 15 and history length 16. The highlight mode 15 includes options for displaying an order of execution of software code. These options may include, for example, displaying the order of execution using varying colors, grey scales, font sizes, or numerals, as described above. The history length 16 allows the user to specify the number of instructions which are displayed with the indication of the order of execution.

Figure 3:
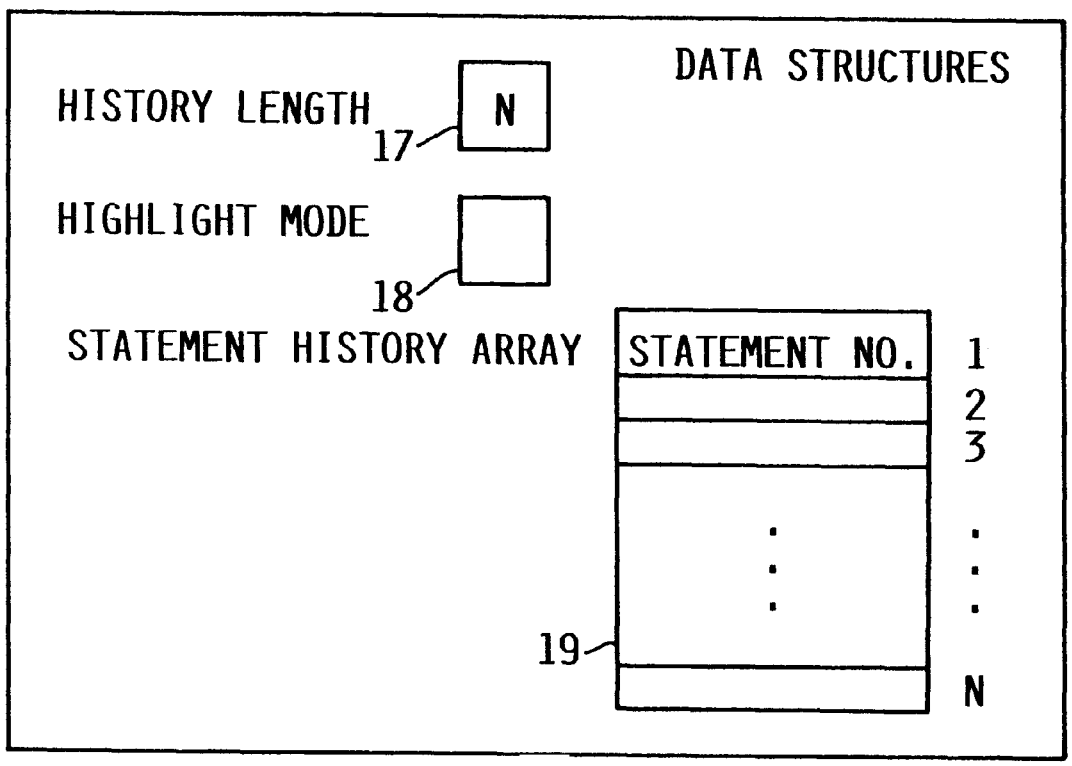
FIG. 3 is a block diagram of data structures used for implementing the present invention.

FIG. 3 is a diagram of data structures used for implementing the present invention within a computer. These data structures preferably include a history length 17 and highlight mode 18, both of which are determined by parameters entered by a user, as explained above. The data structures also include a statement history array 19 for including and managing the instructions which are displayed with the indication of the order of execution.

Figure 4:
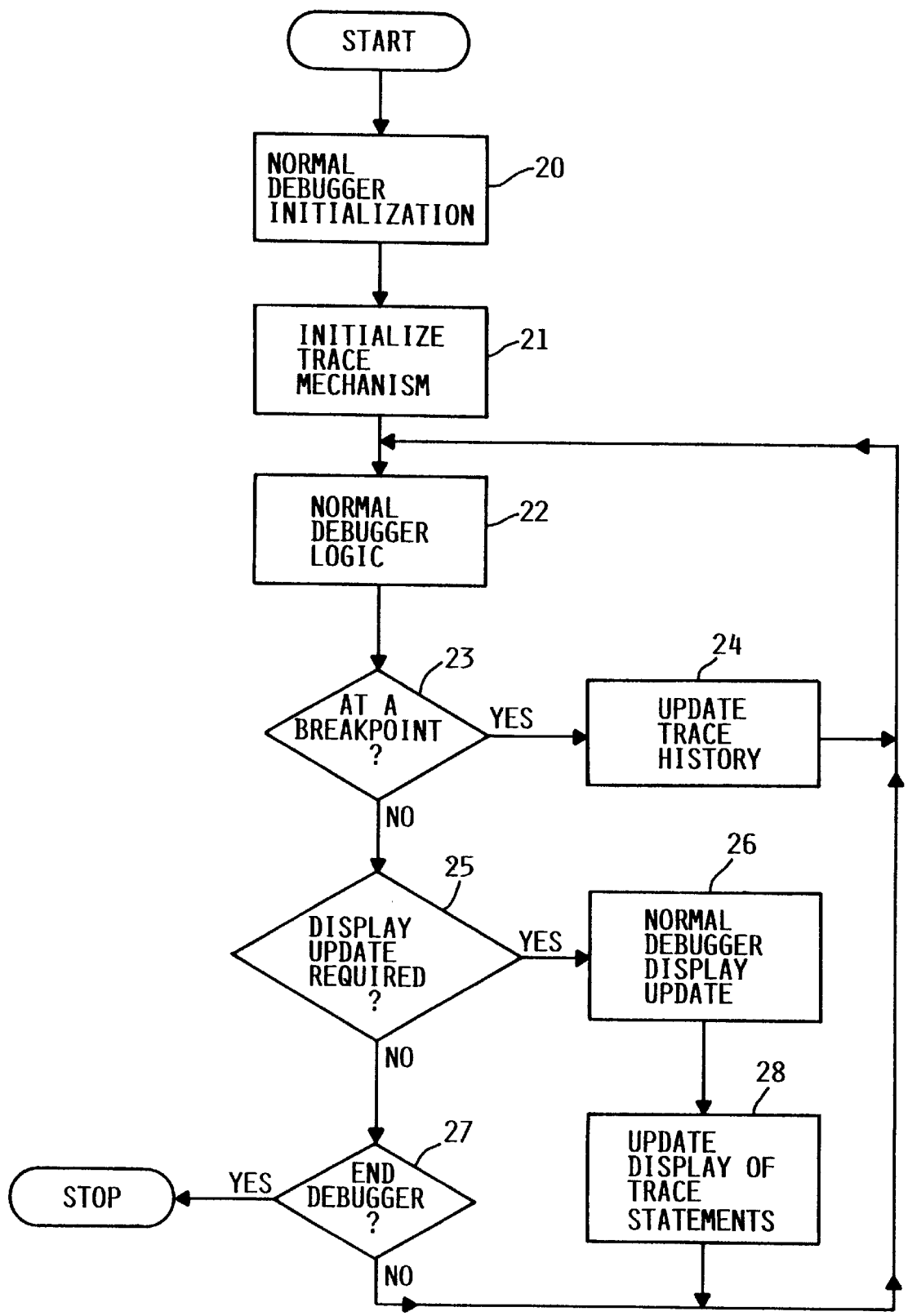
FIG. 4 is a flow chart of a preferred process for implementing the present invention.

FIG. 4 is a flow chart of a preferred process for implementing the present invention within a computer software debugger. For implementing the present invention, the processor 13 is suitably programmed as shown in FIGS. 4–7. The system first initializes the normal software code debugger (20) and then initializes the trace mechanism (21). The system then executes the normal software code debugger logic (22) and determines if it is at a breakpoint within the code (23). If it is at a breakpoint, the system updates the trace history (24) and returns to the normal debugger logic (22). Otherwise, the system determines if display update is required (25). If display update is required, the system updates the normal debugger display (26) and updates display of trace statements (28). The system then determines if it is at the end of the debugger process for the software code (27). If more software code is remaining for the debugger, the system returns to the normal debugger logic (22).

Figure 5:
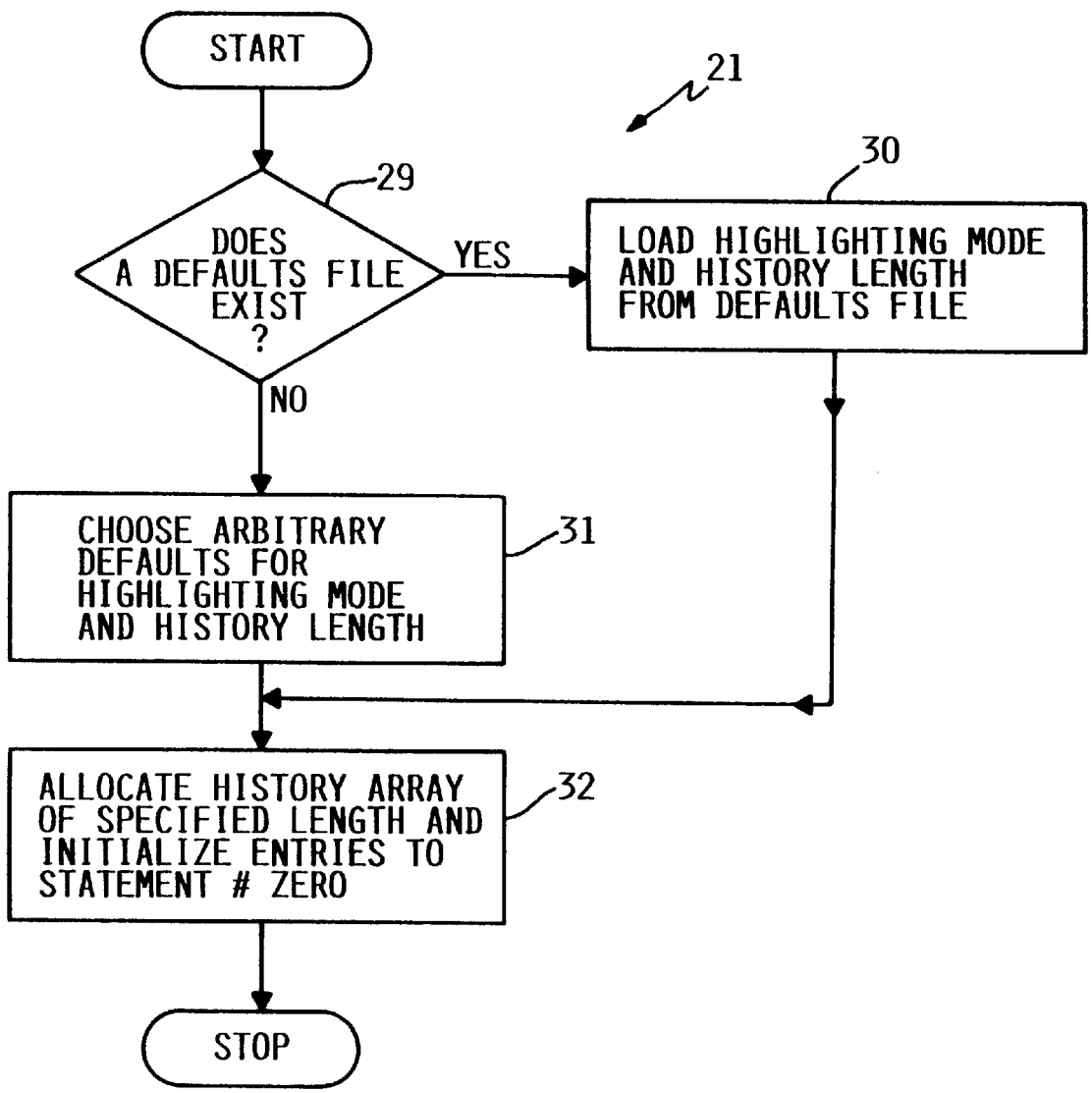
FIG. 5 is a flow chart of a preferred process for initializing trace mechanism.

FIG. 5 is a flow chart of a preferred process for implementing the initialized trace mechanism step (21). The system first determines if a defaults file exists (29). If it does, the system loads the highlighting mode and history length from the defaults file (30). Otherwise, the system chooses arbitrary defaults for highlighting mode and history length (31). The system then allocates history array of specified length and initializes entries to statement number zero (32).

Figure 6:
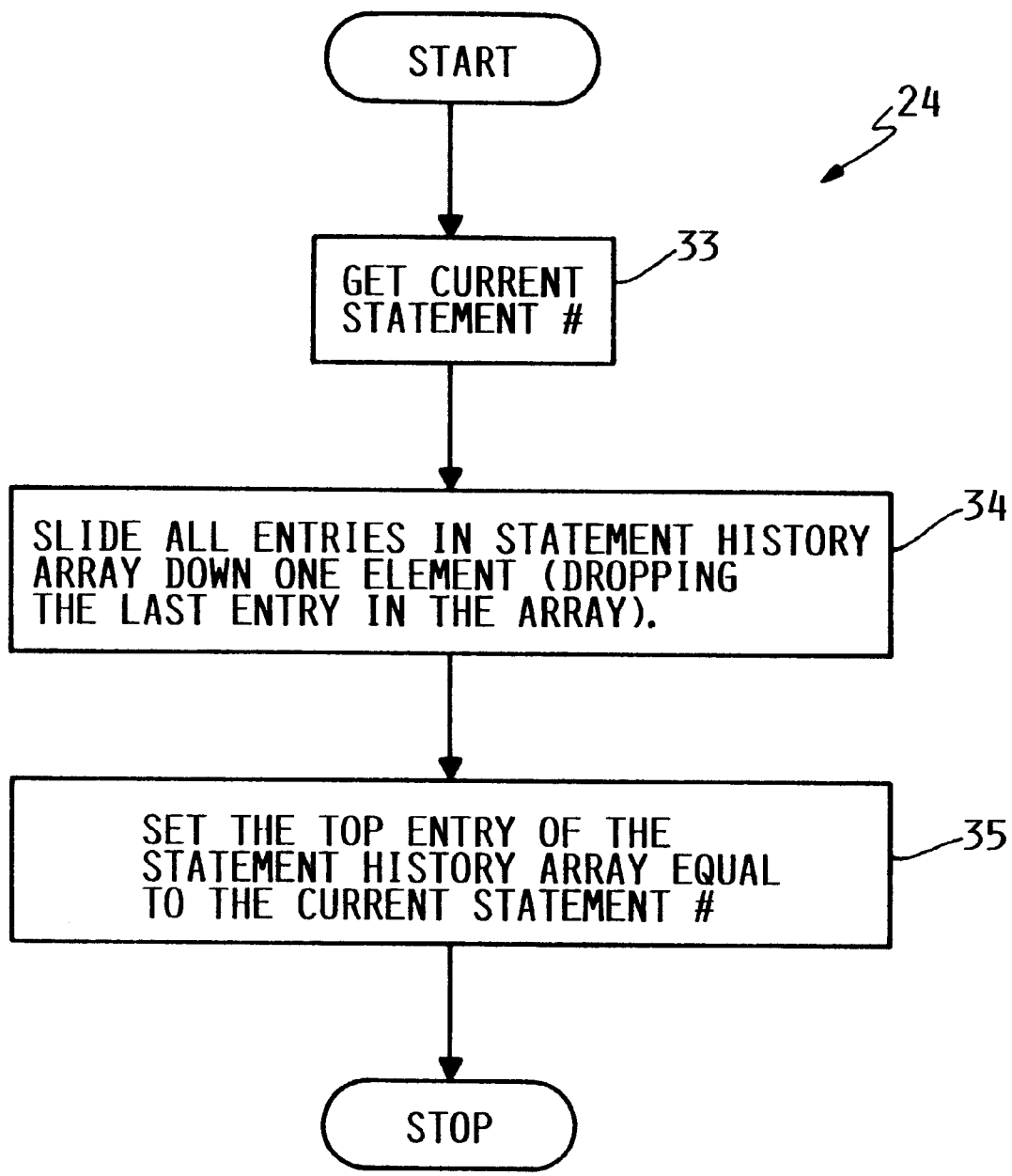
FIG. 6 is a flow chart of a preferred process for updating trace history.

FIG. 6 is a flow chart of a preferred process for implementing the update trace history step (24). The system first retrieves the current statement number (33), slides all entries in statement history array down one element (34), and then sets the top entry of the statement history array equal to the current statement number (35).

Figure 7:
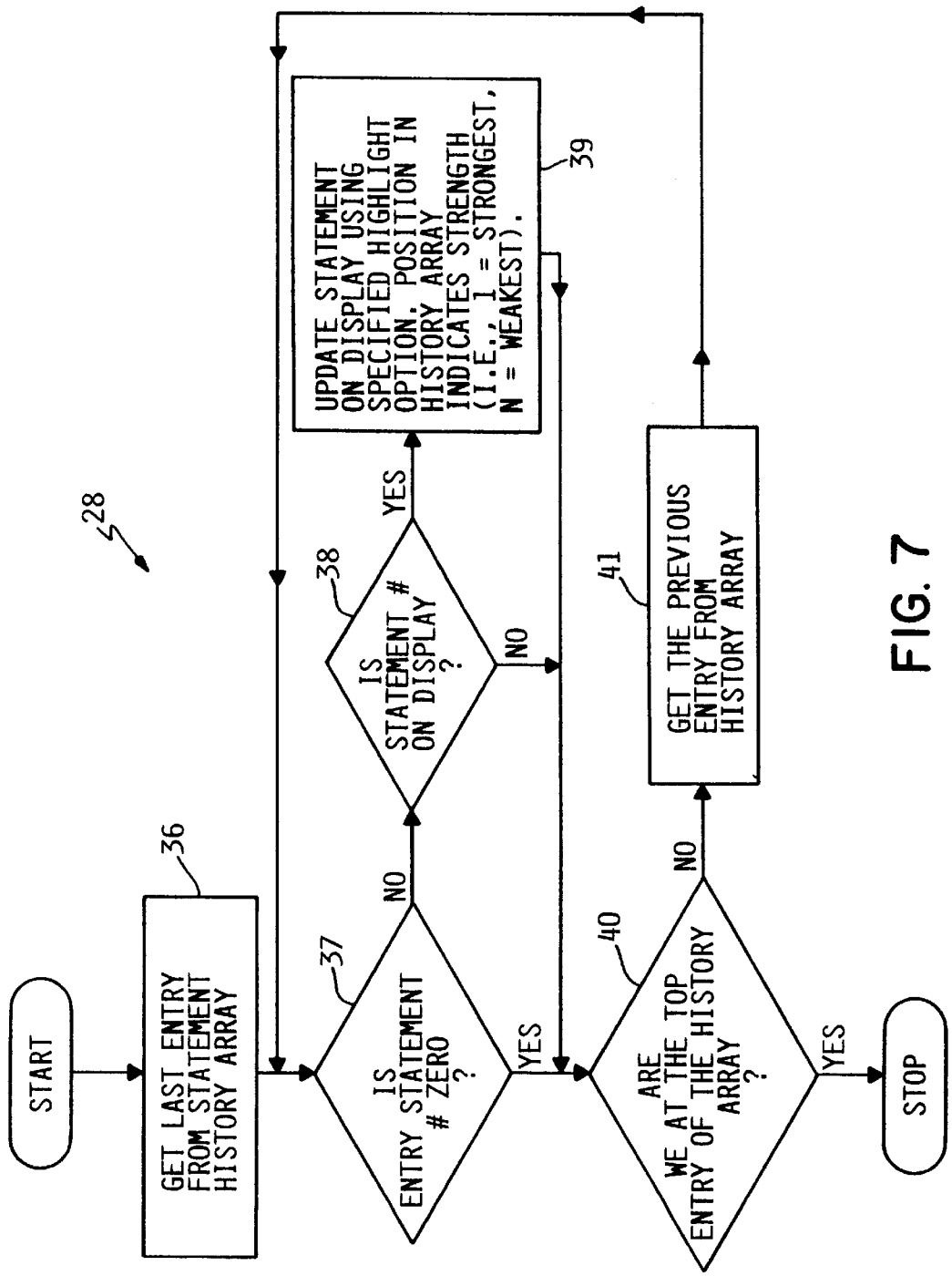
FIG. 7 is a flow chart of a preferred process for updating display of trace statements.

FIG. 7 is a flow chart of a preferred process for implementing the update display of trace statements step (28). The system obtains the last entry from the statement history array (36) and determines if the entry statement number is zero (37). If it is not zero, the system determines if the statement number is on the display (38), and if so, it updates the statement on the display using specified highlight option (39). Otherwise, the system determines if it is at the top entry of the history array (40), it then obtains the previous entry from the history array (41) and returns to step (36). Otherwise, the process is finished.

Figure 8:
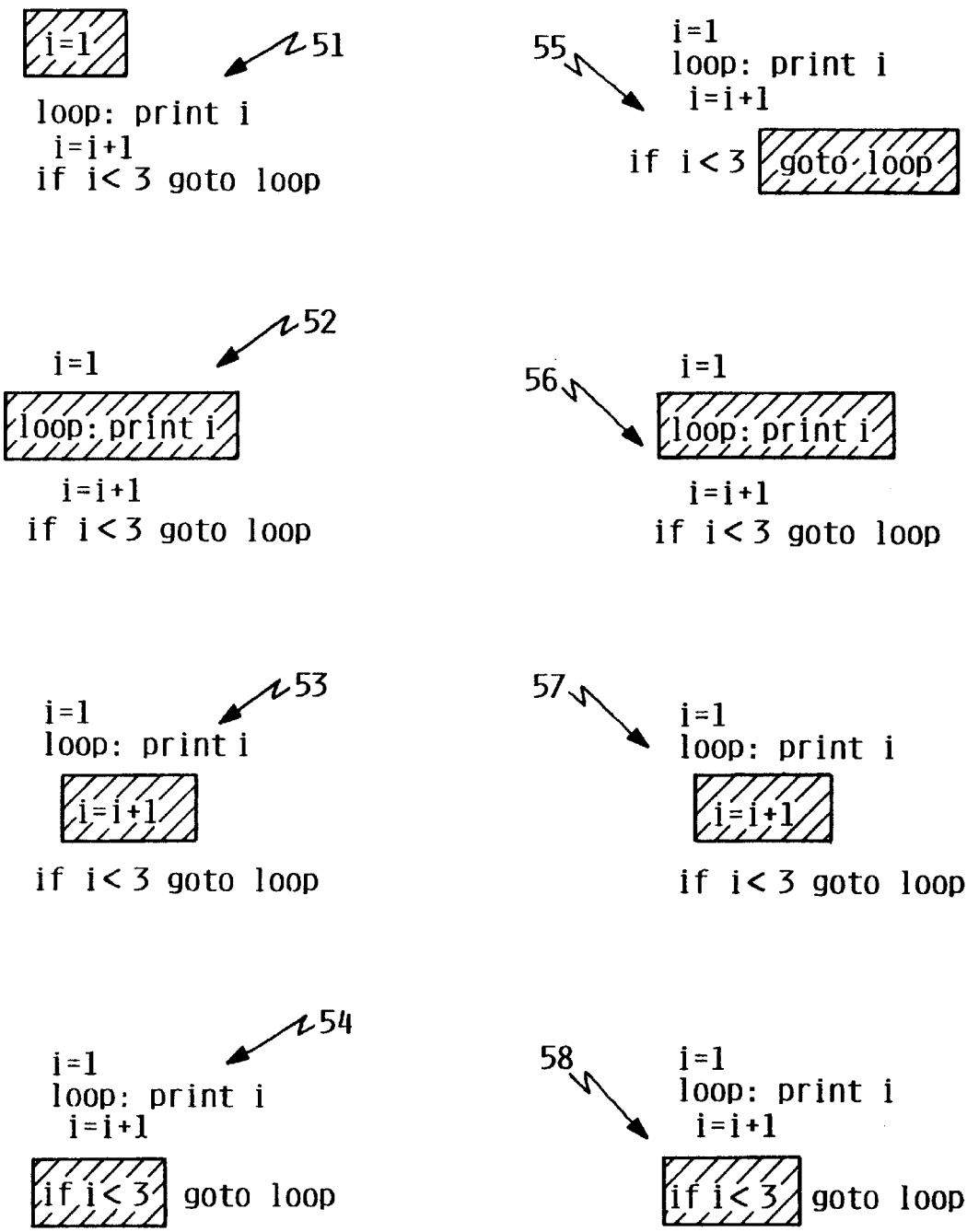
FIG. 8 is a diagram showing an order of execution of exemplary software code.
Figure 9:
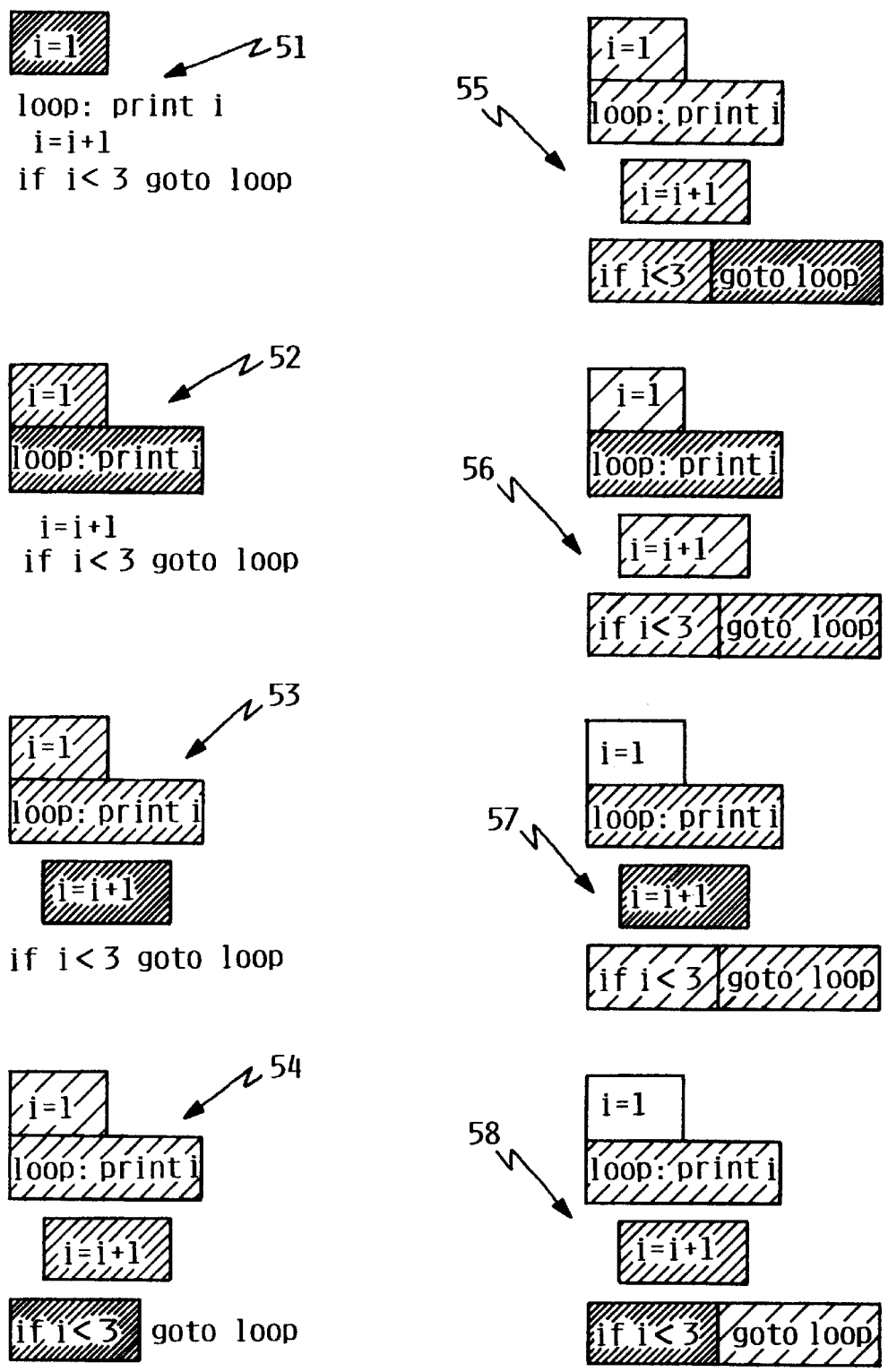
FIG. 9 is a diagram illustrating how the order of execution may be illustrated with different shading.
Figure 10:
FIG. 10 is a diagram illustrating how the order of execution may be illustrated with different sized fonts.
Figure 11:
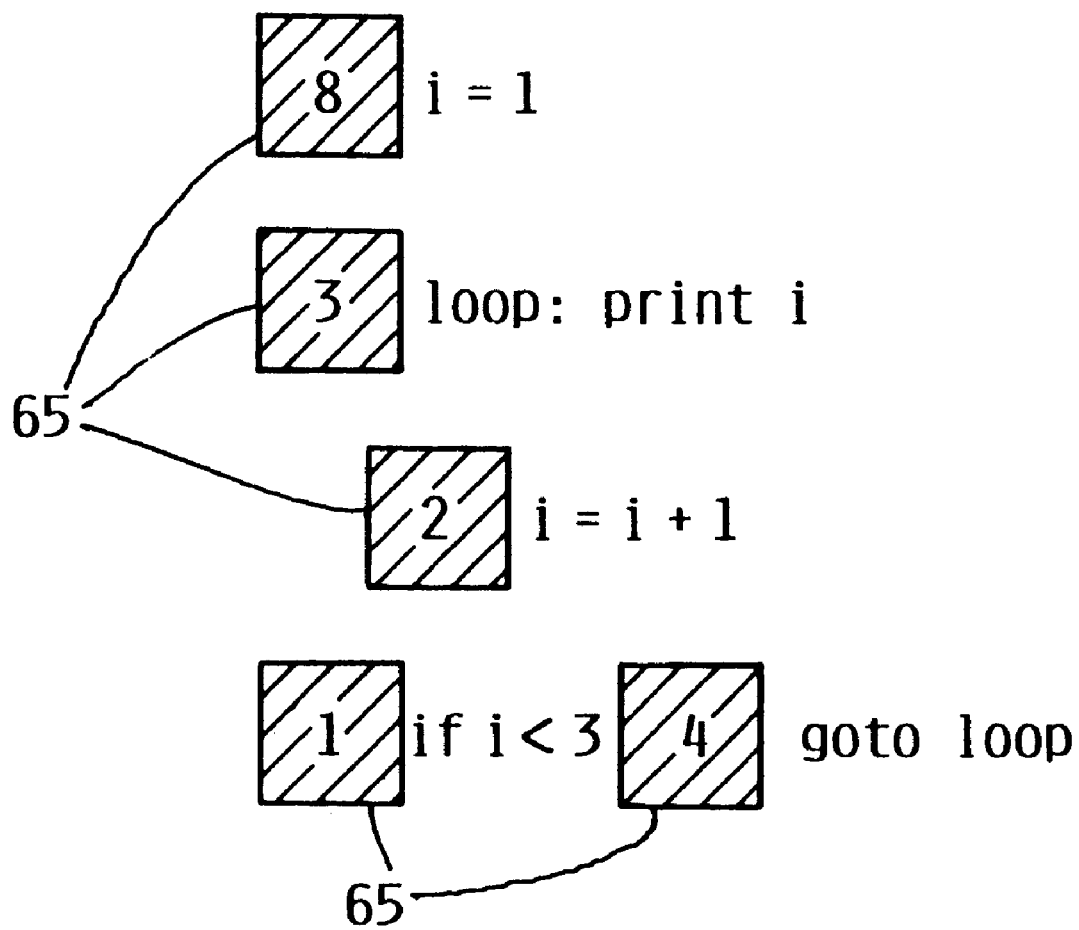
FIG. 11 is a diagram showing the order of execution by way of numerals presented with the code.

FIGS. 8–11 show how the order of execution may be illustrated in alternate embodiments. FIG. 8 shows an order of execution of exemplary software code, shown consecutively as stages 51–58. FIG. 9 shows how the order of execution for stages 51–58 may be illustrated with different shading with the currently-executed instruction presented in, for example, the darkest shading and the previously-executed instructions displayed in progressively lighter shading. While the instructions are displayed in background shading, the instructions themselves could alternatively be shaded. FIG. 10 shows how the order of execution may be illustrated with different sized fonts with, for example, the currently-executed instruction 60 in the largest font and the previously-executed instructions 61, 62 and 63 displayed in progressively smaller fonts. FIG. 11 shows how the order of execution may be illustrated with numerals 65 presented with the code, the numerals 65 corresponding to the order of execution.

While the present invention has been described in connection with a preferred embodiment thereof, it will be understood that many modifications will be readily apparent to those skilled in the art, and this application is intended to cover any adaptations or variations thereof. For example, either a software or hardware embodiment may be used without departing from the scope of the invention. It is manifestly intended that this invention be limited only by the claims and equivalents thereof.

What is claimed is:

1. In a data-processing system having a display device capable of displaying data, an apparatus for illustrating on the display device an order of execution of software code, comprising:

means for presenting at least portions of software code on the display device, the software code representing instructions for operation of a computer under control of a program; and presentation means for presenting with the displayed instructions of the software code an integrated visual indication of a progressive sequence of execution of the displayed instructions for the operation of the computer under control of the program.

2. The system of claim 1 wherein the presentation means comprises means for updating the visual indication of the progressive sequence of execution as additional portions of the software code are presented on the display device.

3. The system of claim 1 wherein the presentation means comprises means for updating the visual indication of the progressive sequence of execution in order to provide a visual indication of a currently-executed instruction within the displayed instructions.

4. The system of claim 3, further comprising means for allowing a user to select one of the instructions as the currently-executed instruction and for updating, in response to the user's selection, the visual indication of the progressive sequence of execution.

5. The system of claim 3, further comprising means for dynamically updating the visual indication of the progressive sequence of execution and for allowing a user to alter a speed at which the presentation means dynamically updates the visual indication of the progressive sequence of execution.

6. The system of claim 1 wherein the presentation means comprises means for allowing a user to specify a number of the displayed instructions presented with the visual indication of the progressive sequence of execution.

7. The system of claim 1 wherein the presentation means comprises means for presenting the displayed instructions in a plurality of colors, the plurality of colors corresponding to the progressive sequence of execution.

8. The system of claim 1 wherein the presentation means comprises means for presenting the displayed instructions in a plurality of background colors, the plurality of background colors corresponding to the progressive sequence of execution.

9. The system of claim 1 wherein the presentation means comprises means for presenting the displayed instructions in a plurality of background shading, the plurality of background shading corresponding to the progressive sequence of execution.

10. The system of claim 1 wherein the presentation means comprises means for presenting the displayed instructions in a plurality of font sizes, the plurality of font sizes corresponding to the progressive sequence of execution.

11. The system of claim 1 wherein the presentation means comprises means for presenting the displayed instructions with a plurality of numerals, the plurality of numerals corresponding to the progressive sequence of execution.

12. A method for illustrating an order of execution of software code, comprising the steps of:
   displaying at least portions of software code on a display device, the software code representing instructions for operation of a computer under control of a program; and
   presenting with the displayed instructions of software code on the display device an integrated visual indication of a progressive sequence of execution of the displayed instructions for the operation of the computer under control of the program.

13. The method of claim 12 wherein the presenting step further comprises the step of updating the visual indication of the progressive sequence of execution as additional portions of the software code are presented on the display device.

14. The method of claim 12 wherein the presenting step further comprises the step of updating the visual indication of the progressive sequence of execution in order to provide a visual indication of a currently-executed instruction within the displayed instructions.

15. The method of claim 14, further comprising the steps of allowing a user to select one of the instructions as the currently-executed instruction and updating, in response to the user's selection, the visual indication of the progressive sequence of execution.

16. The method of claim 14, further comprising the steps of dynamically updating the visual indication of the progressive sequence of execution and allowing a user to alter a speed at which the presentation means dynamically updates the visual indication of the progressive sequence of execution.

17. The method of claim 12 wherein the presenting step comprises the step of allowing a user to specify a number of the displayed instructions presented with the visual indication of the progressive sequence of execution.

18. The method of claim 12 wherein the presenting step comprises the step of presenting the displayed instructions in a plurality of colors, the plurality of colors corresponding to the progressive sequence of execution.

19. The method of claim 12 wherein the presenting step comprises the step of presenting the displayed instructions in a plurality of background colors, the plurality of background colors corresponding to the progressive sequence of execution.

20. The method of claim 12 wherein the presenting step comprises the step of presenting the displayed instructions in a plurality of background shading, the plurality of background shading corresponding to the progressive sequence of execution.

21. The method of claim 12 wherein the presenting step comprises the step of presenting the displayed instructions in a plurality of font sizes, the plurality of font sizes corresponding to the progressive sequence of execution.

22. The method of claim 12 wherein the presenting step comprises the step of presenting the displayed instructions with a plurality of numerals, the plurality of numerals corresponding to the progressive sequence of execution.

23. A data-processing system, comprising:
   a display device capable of displaying data; and
   a computer processor electrically connected to the display device, the processor comprising:
   means for presenting at least portions of software code on the display device, the software code representing instructions for operation of the computer under control of a program; and
   presentation means for presenting with the displayed instructions of the software code an integrated visual indication of a progressive sequence of execution of the displayed instructions for the operation of the computer under control of the program.

* * * * *